(12) United States Patent
Chan et al.

(10) Patent No.: US 12,045,499 B2
(45) Date of Patent: Jul. 23, 2024

(54) STORAGE DEVICE SHARING SYSTEM AND STORAGE DEVICE SHARING METHOD

(71) Applicant: REALTEK SEMICONDUCTOR CORP., Hsinchu (TW)

(72) Inventors: Chun-Chieh Chan, Hsinchu (TW); Wei-Lun Huang, Hsinchu (TW); Chia-Fen Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 236 days.

(21) Appl. No.: 17/877,804

(22) Filed: Jul. 29, 2022

(65) Prior Publication Data
US 2023/0133879 A1    May 4, 2023

(30) Foreign Application Priority Data
Oct. 28, 2021   (TW) .................................. 110139983

(51) Int. Cl.
*G06F 3/06* (2006.01)
(52) U.S. Cl.
CPC .......... *G06F 3/0655* (2013.01); *G06F 3/0626* (2013.01); *G06F 3/0679* (2013.01)

(58) Field of Classification Search
CPC ..... G06F 3/0655; G06F 3/0679; G06F 3/0626
See application file for complete search history.

(56) References Cited

U.S. PATENT DOCUMENTS

| 7,254,688 B2 * | 8/2007 | Uneme ............... G06F 13/4243 |
| | | 710/110 |
| 8,180,990 B2 * | 5/2012 | Kitamura ............. G06F 13/364 |
| | | 711/E12.001 |

\* cited by examiner

*Primary Examiner* — David E Martinez
(74) *Attorney, Agent, or Firm* — Li & Cai Intellectual Property (USA) Office (57) ABSTRACT

A storage device sharing system and a storage device sharing method are provided. The storage device sharing system includes a storage device, a first chip and a second chip. The first chip and the second chip are configured to enter a toggle mode and an arbitration mode. In the toggle mode, the first chip that acts as the master controls the arbitration potential to a first control potential and a second control potential, and communicates with the storage device in response to the arbitration potential being the first control potential, and the second chip that acts as a slave communicates with the storage device in response to the arbitration potential being the second control potential.

20 Claims, 8 Drawing Sheets

STORAGE DEVICE SHARING SYSTEM AND STORAGE DEVICE SHARING METHOD

CROSS-REFERENCE TO RELATED PATENT APPLICATION

This application claims the benefit of priority to Taiwan Patent Application No. 110139983, filed on Oct. 28, 2021. The entire content of the above identified application is incorporated herein by reference.

FIELD OF THE DISCLOSURE

The present disclosure relates to a storage device sharing system and a storage device sharing method, and more particularly to a storage device sharing system and a storage device sharing method that can reduce area usage and power consumption.

BACKGROUND OF THE DISCLOSURE

Nowadays, many consumer products and computer peripheral products, such as notebook computers, computer monitors, TVs, etc., have multiple identical input or output interfaces, for example, multiple USB ports or multiple HDMI ports, and multiple chips having the same function may be used by these interfaces, respectively.

In addition, speeds of various input or output interfaces are also increasing, and the need for chips with signal amplification functions, such as retimers and redrivers, are also increasing. These multiple signal amplification chips with the same interface also use the same firmware. According to the conventional technology, each of these chips is usually equipped with a non-volatile random-access memory (NVRAM) to store the firmware.

Under this architecture, the use of a large number of NVRAMs leads to increased costs and PCB usage area. In addition, as power consumption is gradually being held in higher regard, most products need to pass the scrutiny of power consumption test certifications such as Energy Star (ES) 8.0, and the use of more NVRAM also leads to an increase in power consumption.

SUMMARY OF THE DISCLOSURE

In response to the above-referenced technical inadequacies, the present disclosure provides a storage device sharing system and a storage device sharing method.

In one aspect, the present disclosure provides a storage device sharing system that includes a storage device, a first chip, and a second chip. The first chip is connected to the storage device and having a first arbitration terminal. The second chip is connected to the storage device and has a second arbitration terminal. The second arbitration terminal is connected to the first arbitration terminal and has an arbitration potential. The first chip and the second chip are configured to enter a toggle mode, in which: the first chip acts as a master, and is configured to control the arbitration potential to a first control potential and a second control potential through the first arbitration terminal, and to communicate with the storage device in response to the arbitration potential being the first control potential; the second chip acts as a first slave, and is configured to communicate with the storage device in response to the arbitration potential being the second control potential. The first chip and the second chip are configured to determine whether a preferential communication event occurs, and the first chip or the second chip in which the preferential communication event occurs is configured to enter an arbitration mode, so as to adjust the arbitration potential from a first arbitration potential to a second arbitration potential and to be in communication with the storage device, and to adjust, in response to communication being completed, the arbitration potential from the second arbitration potential to the first arbitration potential.

In another aspect, the present disclosure provides a storage device sharing method, adapted to a storage device sharing system that includes a storage device, a first chip and a second chip, and the storage device sharing method includes: connecting the first chip to the storage device, in which the first chip has a first arbitration terminal; connecting the second chip to the storage device, wherein the second chip has a second arbitration terminal, and the second arbitration terminal is connected to the first arbitration terminal and has an arbitration potential; configuring the first chip and the second chip to enter a toggle mode, which includes: configuring the first chip to act as a master, so as to control the arbitration potential to a first control potential and a second control potential through the first arbitration terminal, and to communicate with the storage device in response to the arbitration potential being the first control potential; configuring the second chip to act as a first slave, so as to communicate with the storage device in response to the arbitration potential being the second control potential; configuring the first chip and the second chip to determine whether a preferential communication event occurs, and configuring the first chip or the second chip in which the preferential communication event occurs to enter an arbitration mode, so as to adjust the arbitration potential from a first arbitration potential to a second arbitration potential and to be in communication with the storage device, and to adjust, in response to communication being completed, the arbitration potential from the second arbitration potential to the first arbitration potential.

Therefore, in the storage device sharing system and storage device sharing method provided by the present disclosure, a structure in which multiple chips share a single storage device is utilized, and since the number of storage devices used is small, power consumption and circuit board usage area can be reduced, thereby reducing costs.

In addition, the storage device sharing system and storage device sharing method provided by the present disclosure are applicable to various existing storage devices and various communication interfaces, have a wide application range and provide high flexibility.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
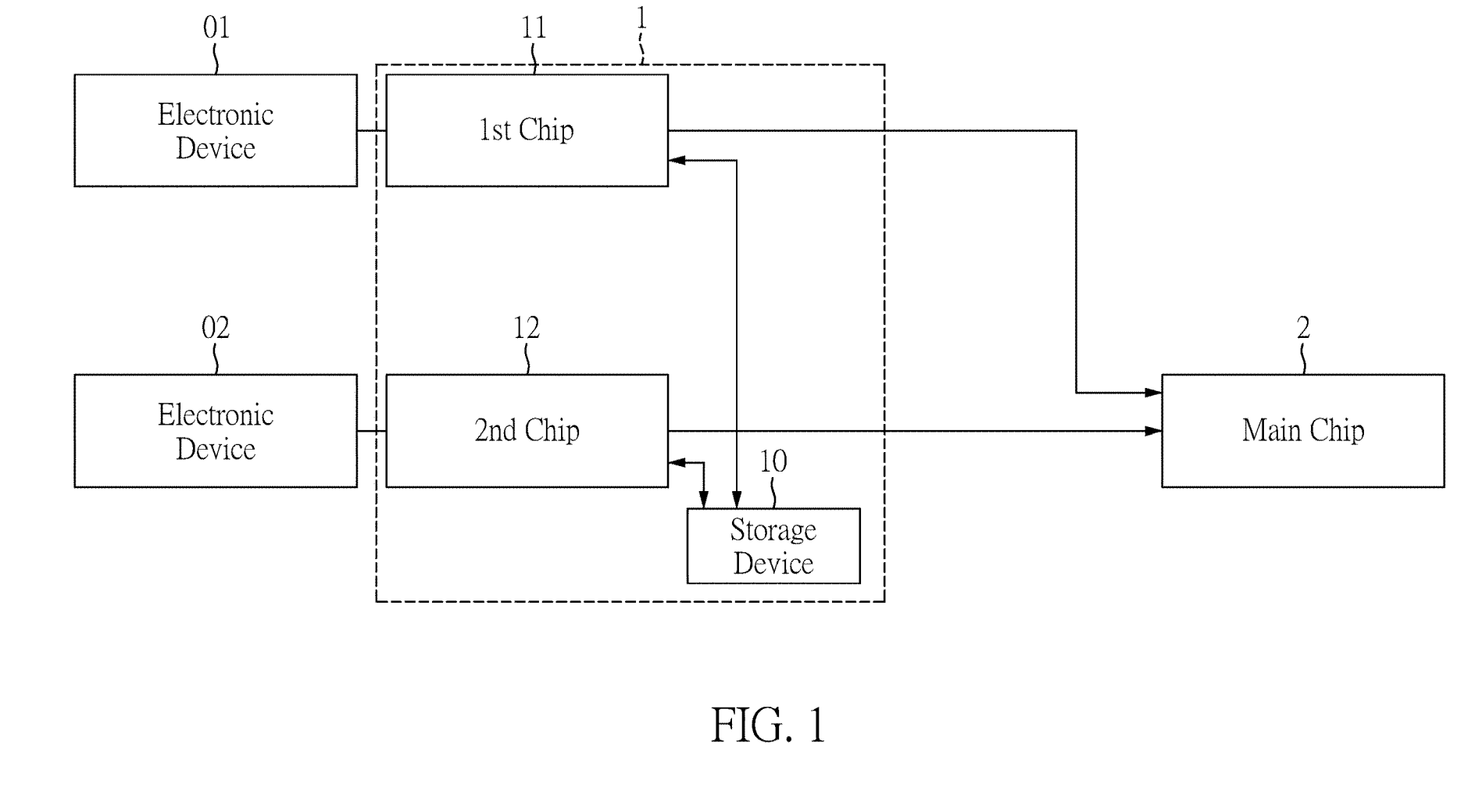
FIG. 1 is a schematic diagram of a storage device sharing system that is applied to a main chip and a plurality of electronic devices according to a first embodiment of the present disclosure.
Figure 2:
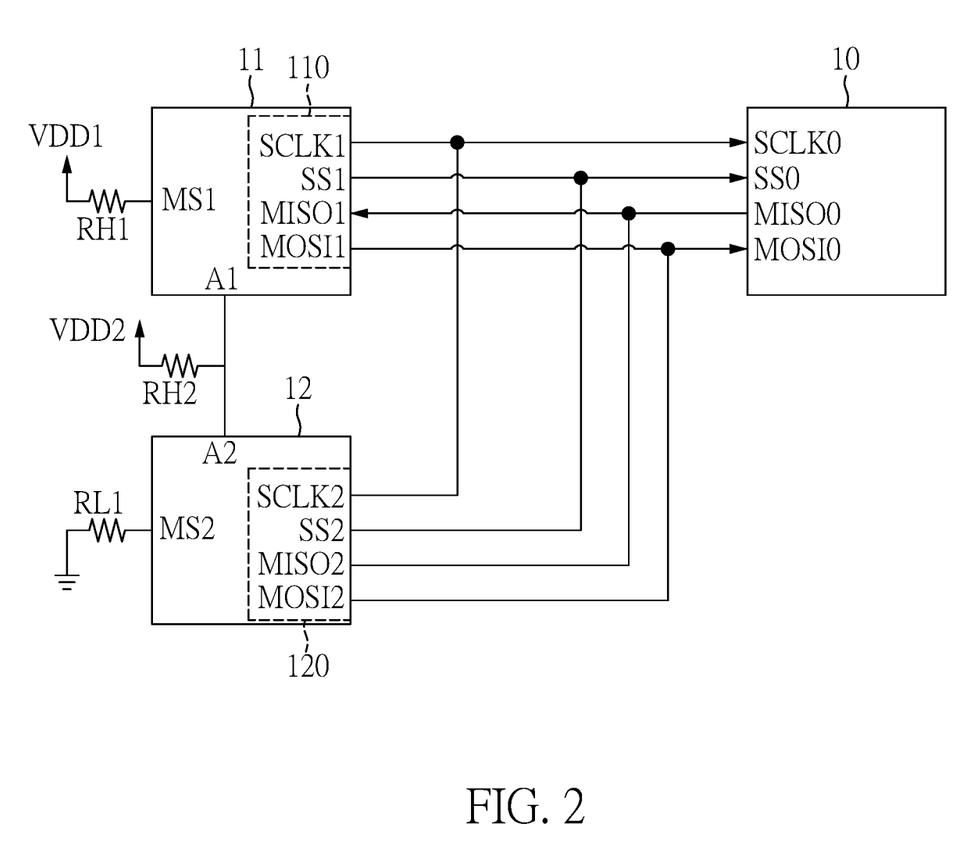
FIG. 2 is a circuit structure diagram of the storage device sharing system according to the first embodiment of the present disclosure.

FIG. 1 is a schematic diagram of a storage device sharing system that is applied to a main chip and a plurality of electronic devices according to a first embodiment of the present disclosure, and FIG. 2 is a circuit structure diagram of the storage device sharing system according to the first embodiment of the present disclosure.

Referring to FIGS. 1 and 2, the first embodiment of the present disclosure provides a storage device sharing system 1, which includes a storage device 10, a first chip 11 and a second chip 12. The storage device 10 can be, for example, but not limited to, a non-volatile random-access memory (NVRAM), a flash memory, an electronic erasable rewritable read-only memory (EEPROM) or a one-time programmable read only memory (OTPROM).

As shown in FIG. 1, the first chip 11 can be connected between an electronic device 01 and a main chip 2, and the second chip 12 can be connected between an electronic device 02 and the main chip 2. In some embodiments, the first chip 11 and the second chip 12 can be, for example, but not limited to, a USB Type-C port control chip, or a high definition multimedia interface (HDMI) control chip, and each has an interface for connecting the electronic device 01 and the electronic device 02, but the present disclosure is not limited thereto.

In addition, the storage device 10 stores one or more firmware for realizing the first chip 11 and the second chip 12. When the first chip 11 and the second chip 12 are configured to perform certain functions, corresponding firmware need to be obtained from the storage device 10.

The first chip 11 is connected to the storage device 10 through a first input/output (I/O) interface 110, and has a first master-slave determination terminal MS1 and a first arbitration terminal A1. The first I/O interface 110 can be, for example, but not limited to, a serial peripheral interface (SPI), an inter-integrated bus circuit (I2C) interface, a display data channel (DDC) and other communication interfaces. The first chip 11 can include, for example, a controller, a microcontroller, or a processor, which is not only used to communicate with the electronic device 01 and the main chip 2, but also used to perform the functions mentioned in the following embodiments of the present disclosure.

As shown in FIG. 2, the first I/O interface 110 that is an SPI interface is taken as an example, the first I/O interface 110 can include pins SCLK1, SS1, MOSI1, and MISO1. The pin SCLK1 is used to transmit a serial clock (SCLK) signal sent by the SPI master, the pin SS1 is used to transmit a slave select (SS) signal sent by the SPI master, the pin MOSI1 is used to transmit a master output slave input (MOSI) signal (data is sent by the SPI master), the pin MISO1 is used to transmit a master input slave output (MISO) signal (data is sent by the SPI slave).

In addition, the storage device 10 can be, for example, a memory with an SPI interface. The pins SCLK1, SS1, MOSI1, and MISO1 can be respectively connected to pins SCLK0, SS0, MOSI0, and MISO0 of the storage device 10 to transmit the SCLK signal, the SS signal, the MOSI signal and the MISO signal, respectively, so as to access the storage device 10.

On the other hand, the second chip 12 is connected to the storage device 10 through a second I/O interface 120, and has a second master-slave determination terminal MS1 and a second arbitration terminal A2. Similarly, the second I/O interface 120 that is an SPI interface is taken as an example, the second I/O interface 120 can include pins SCLK2, SS2, MOSI2, and MISO2, which are connected to the pins SCLK0, SS0, MOSI0, and MISO0 of the storage device 10, respectively. The pin SCLK2 is used to transmit the SCLK signal, the pin SS2 is used to transmit the SS signal, the pin MOSI2 is used to transmit the MOSI signal, and the pin MISO2 is used to transmit the MISO signal.

In this embodiment, the first master-slave determination terminal MS1, the first arbitration terminal A1, the second master-slave determination terminal MS2, and the second arbitration terminal A2 can be, for example, general-purpose input/output (GPIO) pins. Under an architecture where multiple SPI masters (such as the first chip 11 and the second chip 12) share a single SPI slave (such as the storage device 10), the first master-slave determination terminal MS1, the first arbitration terminal A1, the second master-slave determination terminal MS2 and the second arbitration terminal A2 are used to implement communications between the multiple SPI masters, so as to control a timing sequence of the multiple SPI masters corresponding to the single SPI slave.

As shown in FIG. 2, the second arbitration terminal A2 is connected to the first arbitration terminal A1 and has an arbitration potential AP that is as the same as a potential of the first arbitration terminal A1. The first master-slave determination terminal MS1 and the second master-slave determination terminal MS2 are used to define the first chip 11 and the second chip 12 as a master and a slave, respectively. In more detail, the first master-slave determination terminal MS1 and the second master-slave determination terminal MS2 are used to define which one of the multiple SPI masters is the most important SPI master (that is, the master), which has the right to control the arbitration potential AP.

For example, the one that has the right to control the arbitration potential AP can be directly defined by a pull-up resistor and a pull-down resistor on the circuit board. For example, in FIG. 2, the first master-slave determination terminal MS1 is connected to a first voltage source VDD1 through a pull-up resistor RH1, and the second master-slave determination terminal MS2 is connected to a ground terminal through a pull-down resistor RL1. Therefore, potentials of the first master-slave determination terminal MS1 and the second master-slave determination terminal MS2 are used to determine how the first chip 11 and the second chip 12 are allocated as the master and the slave. In the configuration of FIG. 2, the first chip 11 is defined as the master, and the second chip 12 is defined as the slave.

Furthermore, an initial level of the arbitration potential AP can be set by connecting the first arbitration terminal A1 and the second arbitration terminal A2 to the pull-up resistor or the pull-down resistor on the circuit board, and pins of the first arbitration terminal A1 and the second arbitration terminal A2 are set to an open-drain mode. Taking FIG. 2 as an example, the first arbitration terminal A1 and the second arbitration terminal A2 can be connected to a second voltage source VDD2 through a pull-up resistor RH2.

Figure 3:
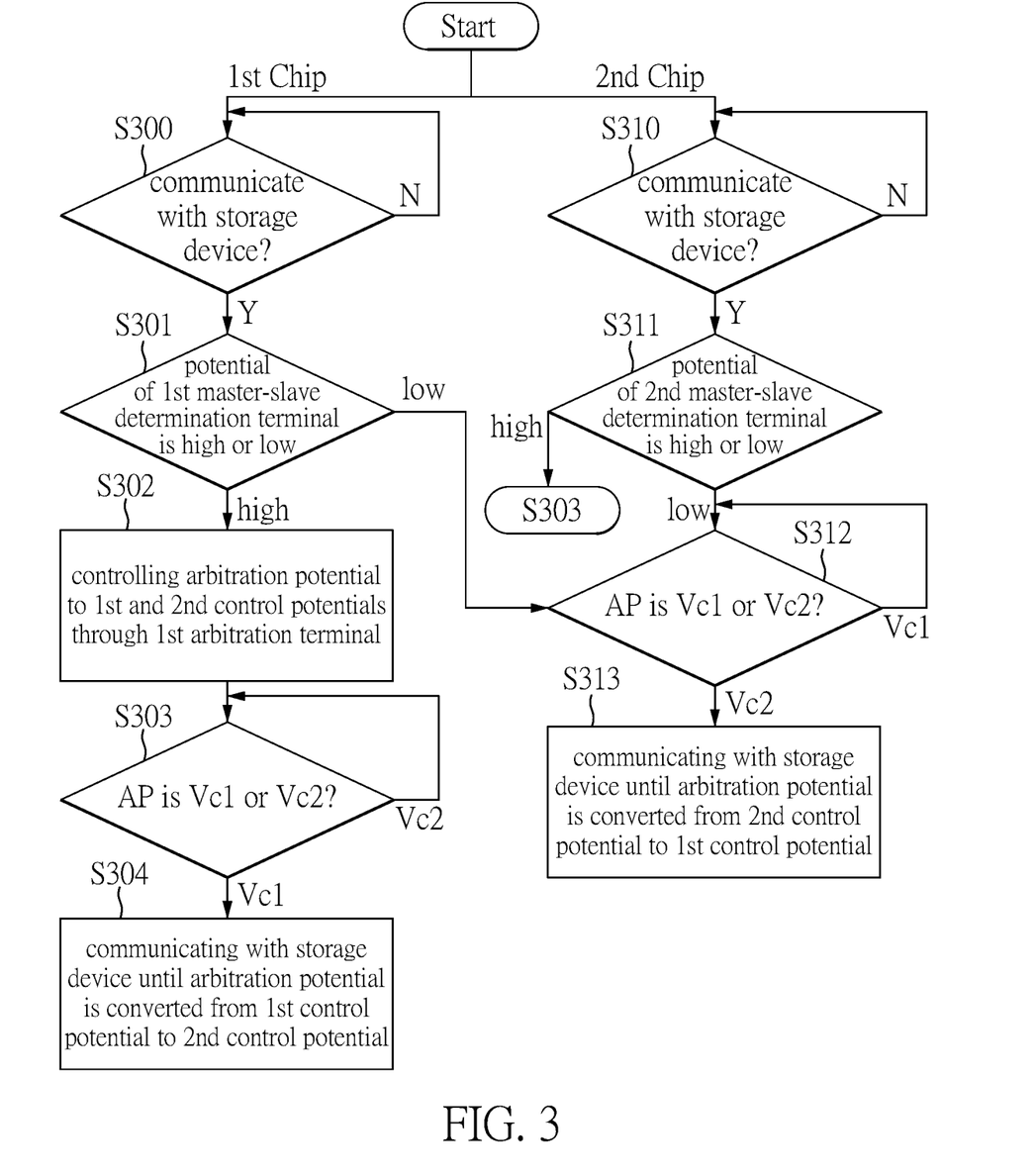
FIG. 3 is a flowchart of a toggle mode according to the first embodiment of the present disclosure.
Figure 4:
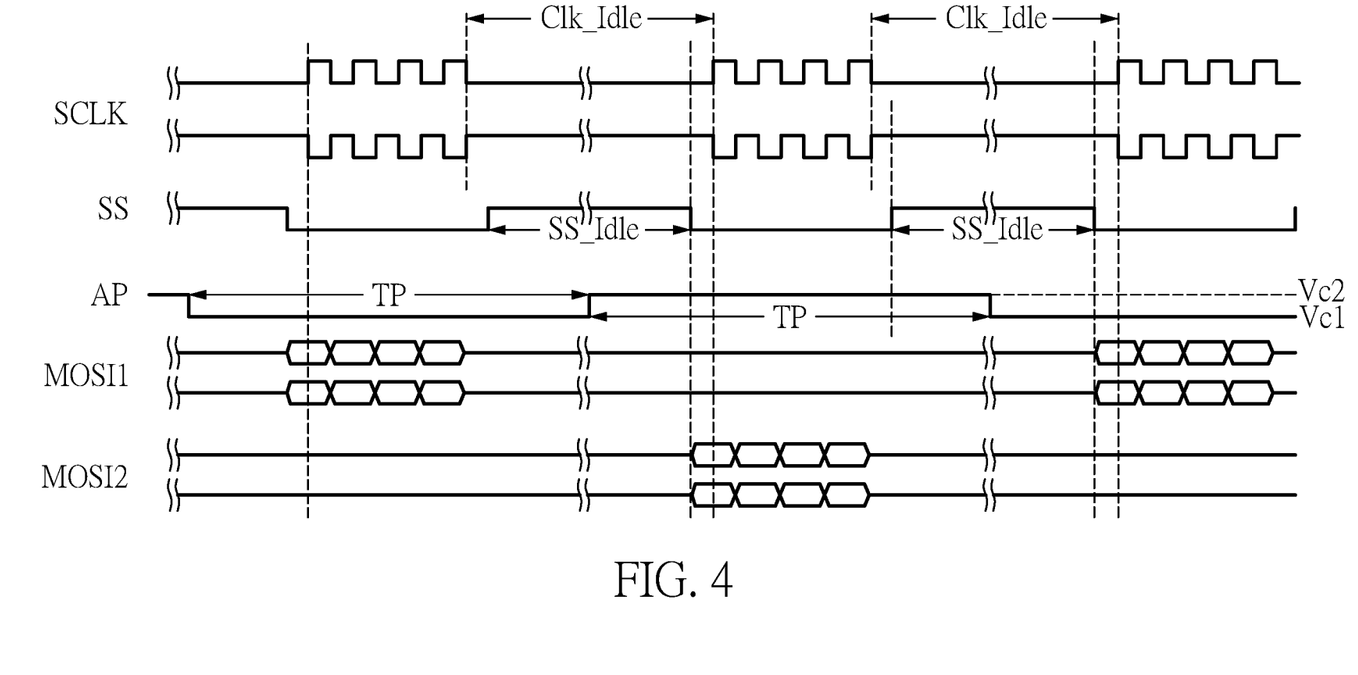
FIG. 4 is a signal timing diagram in the toggle mode according to the first embodiment of the present disclosure.

In the first embodiment of the present disclosure, two control modes are provided, namely an arbitration mode and a toggle mode, and the first chip 11 and the second chip 12 can be dynamically switched into any one of the two modes. The toggle mode will first be described in further detail. In an initialization phase, for example, since all chips need to reload an initialized firmware content from the storage device 10 when the storage device sharing system 1 is turned on, the first chip 11 and the second chip can preferentially enter the toggle mode. Referring to FIGS. 3 and 4, FIG. 3 is a flowchart of a toggle mode according to the first embodiment of the present disclosure, and FIG. 4 is a signal timing diagram in the toggle mode according to the first embodiment of the present disclosure.

As shown in FIG. 3, the toggle mode includes configuring the first chip 11 to perform the following steps:
    Step S300: determining whether or not to communicate with the storage device 10 (that is, to store or read with the storage device 10). In the affirmative, the toggle mode proceeds to step S301. In the negative, the toggle mode repeats step S300.
    Step S301: determining whether a potential of the first master-slave determination terminal MS1 is a high potential or a low potential.
    In this embodiment, since the first chip 11 is defined as the master by connecting the first master-slave determination terminal MS1 to the pull-up resistor RH1, if the potential of the first master-slave determination terminal MS1 is the high potential, it can be confirmed that the first chip 11 is the master, and the toggle mode proceeds to step S302: controlling the arbitration potential AP to a first control potential Vc1 and a second control potential Vc2 through the first arbitration terminal A1. For example, as shown in the arbitration potential AP in FIG. 4, the arbitration potential AP is controlled to the first control potential Vc1 and the second control potential Vc2 in a period TP.

If the potential of the first master-slave determination terminal MS1 is the low potential, it means that the first chip 11 is defined as the slave, and a process corresponding to the second chip 12 in this embodiment, such as that provided under step S312, is executed.

Step S303: determining whether the arbitration potential AP is the first control potential Vc1 or the second control potential Vc2.

In response to determining that the arbitration potential AP is the first control potential Vc1, the toggle mode proceeds to step S304: communicating with the storage device 10 until the arbitration potential AP is converted from the first control potential Vc1 to the second control potential Vc2. In this step, the first chip 11 operates the SS signal, SCLK signal, MOSI signal, and MISO signal to communicate with the storage device 10, as shown in FIG. 4.

In response to determining that the arbitration potential AP is the second control potential Vc2 in step S304, the toggle mode repeats step S303 until the arbitration potential AP is converted from the second control potential Vc2 to the first control potential Vc1.

Further referring to FIG. 3, the toggle mode also includes configuring the second chip 12 to perform the following steps:
    Step S310: determining whether to communicate with the storage device 10. In the affirmative, the toggle mode proceeds to step S301. In the negative, the toggle mode repeats step S310.
    Step S311: determining whether a potential of the second master-slave determination terminal MS2 is a high potential or a low potential.
    In this embodiment, since the second chip 12 is defined as the slave by connecting the second master-slave determination terminal MS2 to the pull-down resistor RH2, if the potential of the second master-slave determination terminal MS2 is the high potential, it can be confirmed that the second chip 12 is the slave, and the toggle mode proceeds to step S312: determining whether the arbitration potential AP is the first control potential Vc1 or the second control potential Vc2.

If the potential of the second master-slave determination terminal MS2 is the high potential, it means that the second chip 12 is defined as the master, and the process corresponding to the first chip 11 in this embodiment is executed, for example, step S303.

In response to determining that the arbitration potential AP is the second control potential Vc2, the toggle mode proceeds to step S313: communicating with the storage device 10 until the arbitration potential AP is converted from the second control potential Vc2 to the first control potential Vc1. In response to determining that the arbitration potential AP is the first control potential Vc1 in step S312, the toggle mode repeats step S312 until the arbitration potential AP is converted from the first control potential Vc1 to the second control potential Vc2.

The first chip 11 whose first master-slave determination terminal MS1 is at the high potential communicates with the storage device 10 when the arbitration potential AP is at the first control potential Vc1 (low potential), and the second chip 12 whose second master-slave determination terminal MS2 is at the low potential operates the SS signal, SCLK signal, MOSI signal, and MISO signal to communicate with the storage device 10 in response to the arbitration potential AP being the second control potential Vc2 (high potential). In addition, in FIG. 2, in response to the communication with the storage device 10 being completed, the first chip 11 and the second chip 12 both operate the SS, SCLK, MOSI, and MISO signals to an idle state, as shown by idle times Clk_Idle and SS_Idle in FIG. 4.

Therefore, the process of the toggle mode is simple, and the first chip 11 and the second chip 12 can communicate with the storage device 10 in an even, time-sharing manner. However, the period TP can be adjusted according to demand, and is not limited to being assigned in fixed and even manners.

Details on the arbitration mode will next be described. When a preferential communication event occurs in a chip, it can be switched to the arbitration mode, such that the chip can communicate with the storage device 10 and read the requisite firmware with a higher immediacy. The preferential communication event can be, for example, that the chip detects a connection with the electronic device, or that the chip triggers functions of current and voltage protections.

In addition, when the chip has a communication message that needs to be replied or a process with an electronic device that is connected to the chip, the chip can also enter the arbitration mode. For example, when the chip has a USB Type-C port controller function, it may receive different power delivery (PD) requests at any time and necessitate immediate communication with the storage device 10 to obtain the corresponding firmware.

Alternatively, when an interrupt event of a microcontroller of the chip is triggered, the chip also enters the arbitration mode. For example, when the chip is a retimer, it may be necessary to enter an interrupt flow for immediate processing due to abnormalities of the transmitted data.

Figure 5:
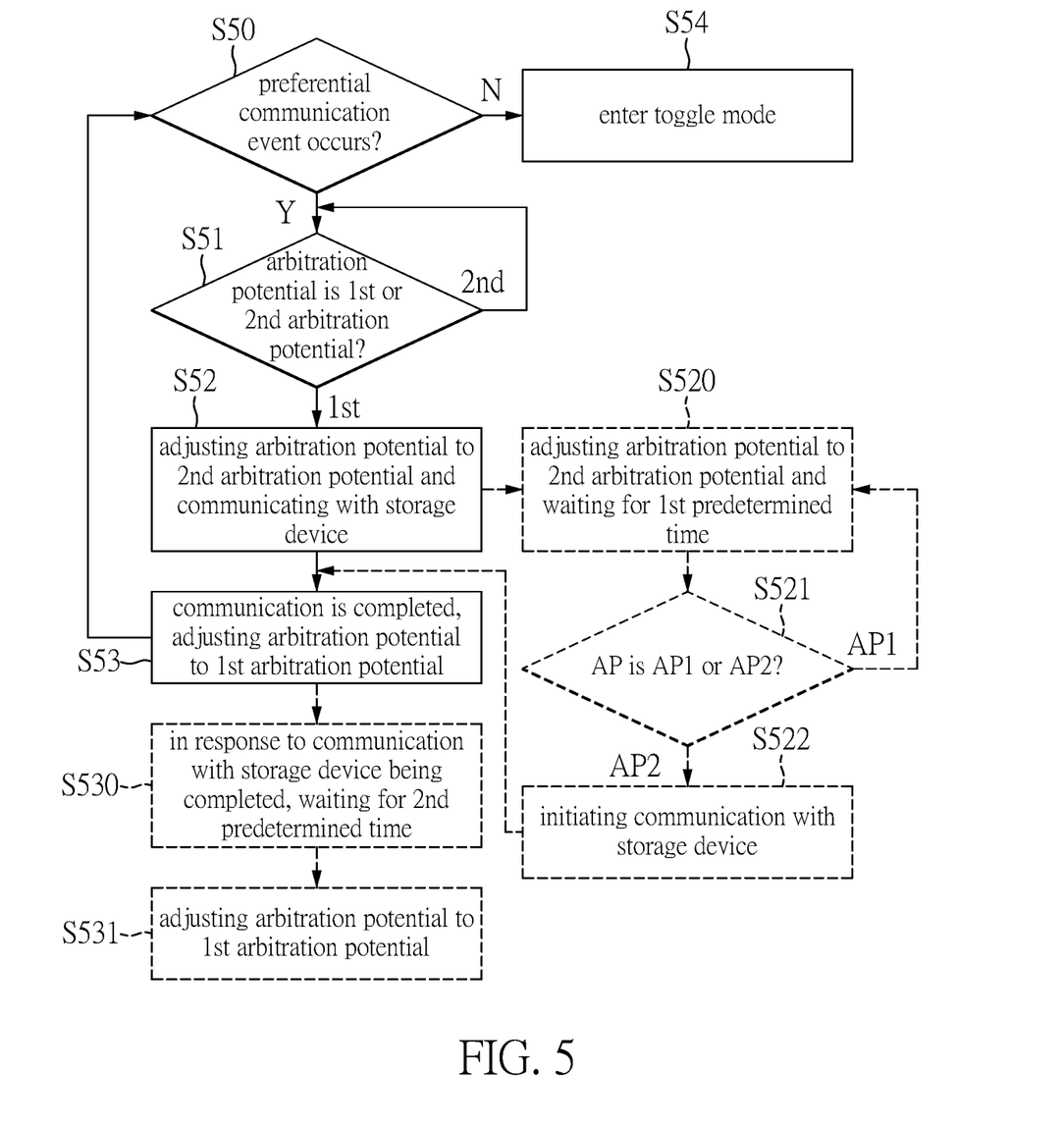
FIG. 5 is a flowchart of an arbitration mode according to the first embodiment of the present disclosure.
Figure 6:
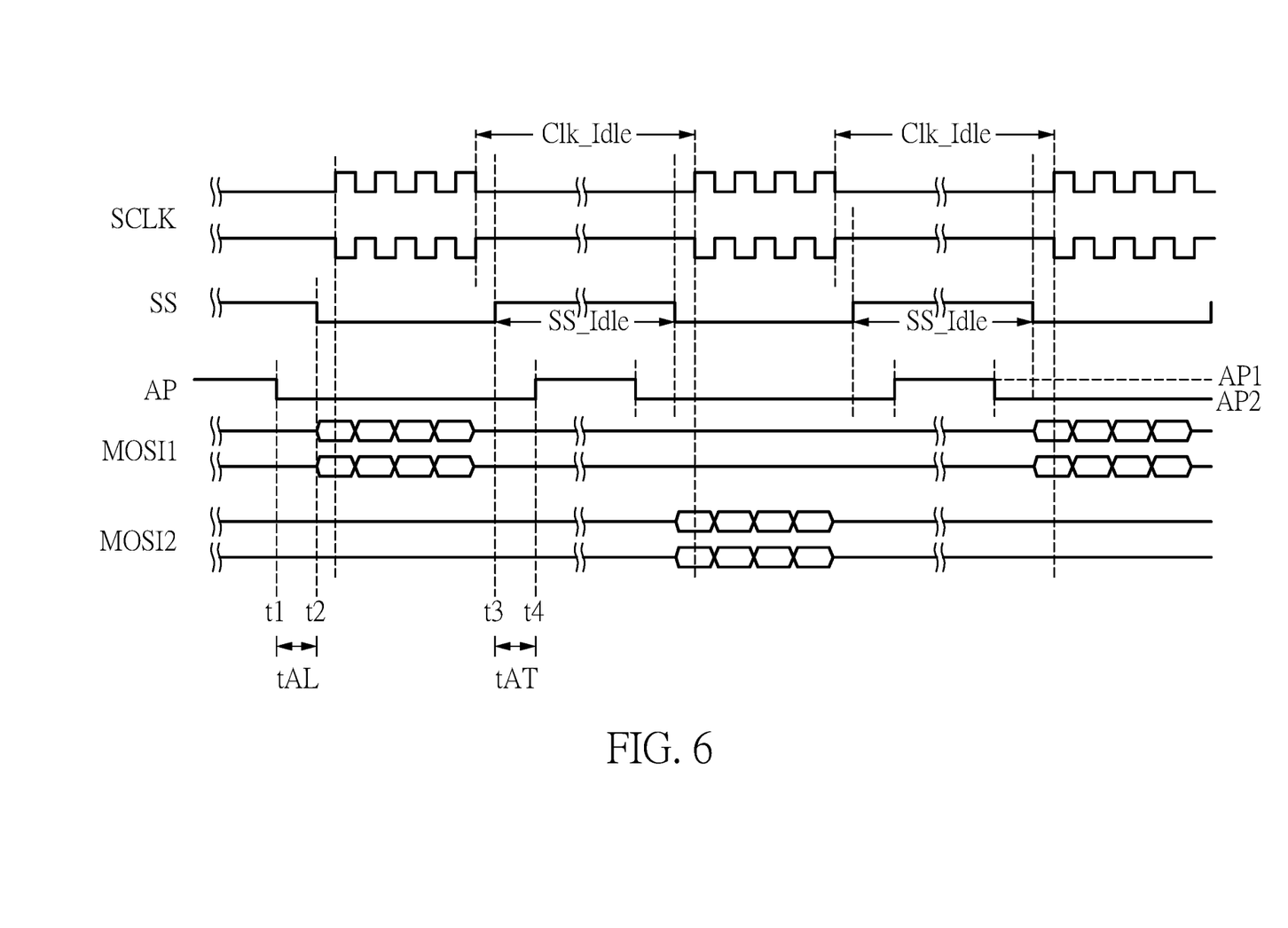
FIG. 6 is a signal timing diagram in the arbitration mode according to the first embodiment of the present disclosure.

Reference is made to FIGS. 5 and 6, FIG. 5 is a flowchart of an arbitration mode according to the first embodiment of the present disclosure, and FIG. 6 is a signal timing diagram in the arbitration mode according to the first embodiment of the present disclosure.

The first chip 11 and the second chip 12 are respectively configured to perform the following steps:

Step S50: determining whether a preferential communication event occurs. Whichever one of the first and second chips 11, 12 having the preferential communication event enters the arbitration mode.

Step S51: determining whether the arbitration potential AP is the first arbitration potential AP1 or the second arbitration potential AP2. As shown in FIG. 6, due to the pull-up resistor RH2, the first arbitration potential AP1 and the second arbitration potential AP2 are oppositely high and low potentials, respectively. In this embodiment, the first arbitration potential AP1 and the aforementioned second control potential Vc2 are the same potential (high potential), and the second arbitration potential AP2 and the aforementioned first control potential Vc1 are the same potential (low potential), but the present disclosure is not limited thereto.

In response to the arbitration potential AP being the first arbitration potential AP1, the arbitration mode proceeds to step S52: adjusting the arbitration potential AP to the second arbitration potential AP2, and communicating with the storage device 10. In response to the arbitration potential AP being the second arbitration potential AP2, meaning that other chips may be communicating with the storage device 10, the arbitration mode repeats step S52 until the arbitration potential AP is converted to the first arbitration potential AP1.

In response to the communication with the storage device 10 being completed, the arbitration mode proceeds to step S53: adjusting the arbitration potential AP to the first arbitration potential AP1. The arbitration mode then returns to step S50.

In response to determining that the preferential communication event is excluded in step S50, the arbitration mode proceeds to step S54: configuring the first chip 11 and the second chip 12 to enter the toggle mode.

As shown in FIGS. 5 and 6, step S52 can further include:
Step S520: adjusting the arbitration potential AP to the second arbitration potential AP2 and waiting for the first predetermined time tAL.
Step S521: determining whether the arbitration potential AP is the first arbitration potential AP1 or the second arbitration potential AP2.

In response to the arbitration potential AP being the second arbitration potential AP2, step S522 is executed: initiating communication with the storage device. Otherwise, step S520 is returned to.

In other words, the arbitration potential AP is operated at the low potential at time t1, time t2 is then reached after the first predetermined time tAL, and then the arbitration potential AP is confirmed again to be at the low potential, the SS signal, SCLK signal, MOSI signal, and MISO signal can then be operated to communicate with the storage device 10.

Step S53 further includes:
Step S530: in response to the communication with the storage device 10 being completed, waiting for a second predetermined time tAT.
Step S531: adjusting the arbitration potential AP to the first arbitration potential AP1.

In other words, after the communication with the storage device 10 is completed, the SS signal, SCLK signal, MOSI signal, and MISO signal are first operated to the idle state, as shown by time t3 and idle times Clk_Idle and SS_Idle in FIG. 6. Then, the arbitration potential AP is kept at the low potential for a period of time, for example, the second predetermined time tAT, and time t4 in FIG. 6 is then reached.

The above-mentioned first predetermined time tAL is to prevent multiple SPI masters from simultaneously initiating communication with the SPI slave, and the above-mentioned second predetermined time tAT is to ensure that the SPI slave have stably read the SS, SCLK, MOSI, MISO signals and restored to the idle state, such that other SPI masters can communicate with the SPI slave in the future. Although a control flow of the arbitration mode is more complicated, it allows the chip to communicate with the storage device in the higher immediacy.

Second Embodiment

Figure 7:
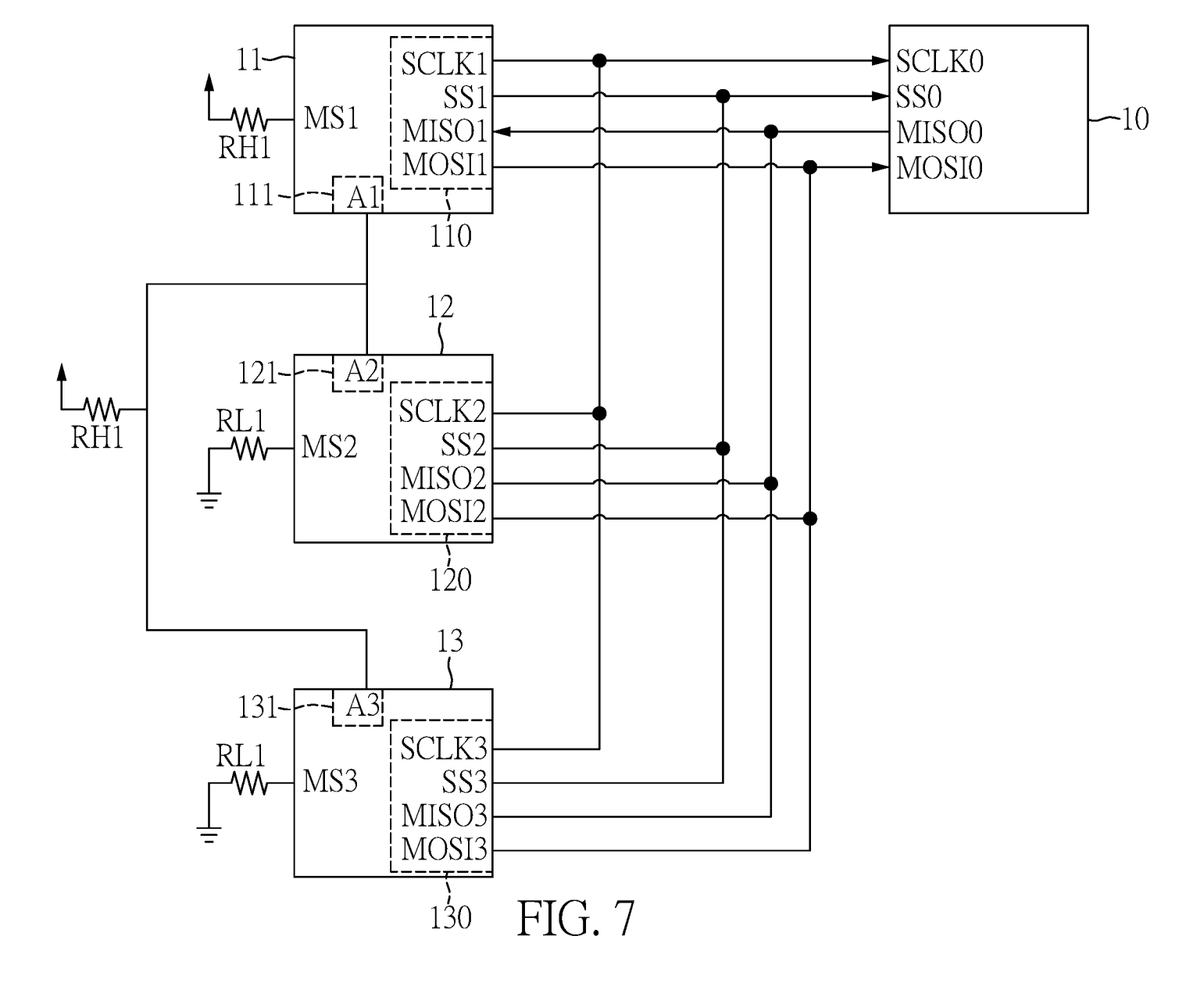
FIG. 7 is a circuit diagram of a storage device sharing system according to a second embodiment of the present disclosure.

FIG. 7 is a circuit diagram of a storage device sharing system according to a second embodiment of the present disclosure. The present embodiment utilizes an architecture that is similar to the first embodiment, and thus repeated descriptions are omitted.

The difference between this embodiment and the first embodiment is that the storage device sharing system 1 further includes a third chip 13, which is connected to the storage device 10 through a third I/O interface 130, and has a third master-slave determination terminal MS3 and a third arbitration terminal A3. The number of chips in the storage device sharing system 1 is not limited to being three as provided in this embodiment, and can be increased and applied according to the method of this embodiment.

The third arbitration terminal A3 is connected to the first arbitration terminal A1 and the second arbitration terminal A2, and also has the arbitration potential AP. In contrast to the first chip 11 and the second chip 12 being defined as the master and the slave, the third master-slave determination terminal MS3 is similarly used to define the third chip 13 as another slave. The third I/O interface 130 can include pins SCLK3, SS3, MOSI3, and MISO3, that are respectively connected to the pins SCLK0, SS0, MOSI0, and MISO0 of the storage device 10 and used to transmit signals such as the SCLK, SS, MOSI, and MISO signals.

In this embodiment, the SPI master that acts as the master (i.e., the first chip 11) needs to replace the first arbitration terminal A1 with a voltage control circuit 111 from the GPIO of the previous embodiment, so as to output multi-level voltages by acting as an arbitration potential generator, and to conveniently determine, by three phases in the toggle mode, lengths of time during which the first chip 11, the second chip 12, and the third chip 13 can access the storage device 10.

In this embodiment, the first chip 11, the second chip 12, and the third chip 13 can use the same process as the first embodiment to execute the arbitration mode, the details of which are not repeated here. The SPI slaves that act as the slaves (i.e., the second chip 12 and the third chip 13) need to replace the second arbitration terminal A2 and the third arbitration terminal A3 from the GPIO of the previous embodiment with signal converters 121 and 131, e.g., analog-to-digital converters, which are capable of reading three-stage (or multi-stage) potentials.

Figure 8:
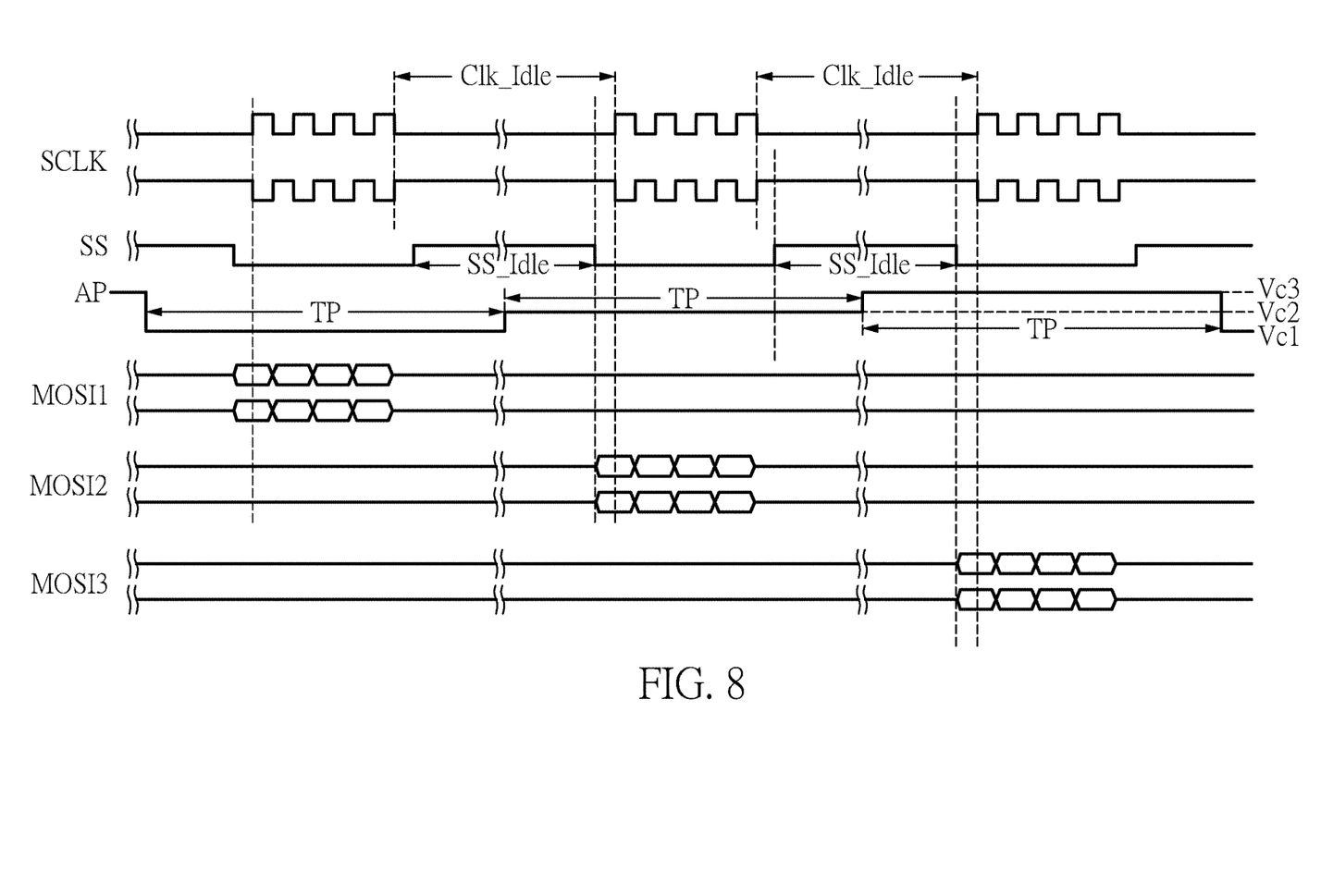
FIG. 8 is a signal timing diagram in the toggle mode according to the second embodiment of the present disclosure.

It should be noted that the toggle mode is different from the first embodiment. The following is based on FIG. 3 and the differences are explained with reference to FIG. 8. FIG. 8 is a signal timing diagram in the toggle mode according to the second embodiment of the present disclosure. As in step S302, the difference is that the first chip 11 further controls the arbitration potential AP to the first control potential Vc1, the second control potential Vc2, and the third control potential Vc3 through the aforementioned voltage control circuit and the first arbitration terminal.

The difference from step S303 is that the first chip 11 is configured to determine whether the arbitration potential AP is the first control potential Vc1, the second control potential Vc2, or the third control potential Vc3.

In response to determining that the arbitration potential AP is the first control potential Vc1, the first chip 11 communicates with the storage device 10. If the arbitration potential AP is the second control potential Vc2 or the third control potential Vc3, then the first chip 11 waits until the arbitration potential AP is converted to the first control potential Vc1, as shown by a signal timing of the pin MOSI1 in FIG. 8.

For the second chip 12, the difference is that in step S312, the second chip 12 determines whether the arbitration potential AP is the first control potential Vc1, the second control potential Vc2, or the third control potential Vc3 through the signal converter 121. In response to determining that the arbitration potential AP is the second control potential Vc2, the second chip 12 communicates with the storage device 10. If the arbitration potential AP is the first control potential Vc1 or the third control potential Vc3, the second chip 12 waits until the arbitration potential AP is converted to the second control potential Vc2, as shown by a signal timing of the pin MOSI2 in FIG. 8.

Similar to the second chip 12, the third chip 13 uses the signal converter 131 to determine whether the arbitration potential AP is the first control potential Vc1, the second control potential Vc2, or the third control potential Vc3. In response to determining that the arbitration potential AP is the third control potential Vc3, the third chip 13 communicates with the storage device 10. If the arbitration potential AP is the first control potential Vc1 or the second control potential Vc2, the third chip 13 waits until the arbitration potential AP is converted to the third control potential Vc3, as shown by a signal timing of the pin MOSI3 in FIG. 8.

Beneficial Effects of the Embodiments

In conclusion, in the storage device sharing system and storage device sharing method provided by the present disclosure, a structure that multiple chips share a single storage device is utilized, and since the number of storage devices used is small, power consumption and circuit board usage area can be reduced, thereby reducing costs.

In addition, the storage device sharing system and storage device sharing method provided by the present disclosure are applicable to various existing storage devices and various communication interfaces, have a wide application range and provide high flexibility.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A storage device sharing system, comprising:
   a storage device;
   a first chip connected to the storage device and having a first arbitration terminal;
   a second chip connected to the storage device and having a second arbitration terminal, wherein the second arbitration terminal is connected to the first arbitration terminal and has an arbitration potential,
   wherein the first chip and the second chip are configured to enter a toggle mode, wherein:
      the first chip acts as a master, and is configured to control the arbitration potential to a first control potential and a second control potential through the first arbitration terminal, and to communicate with the storage device in response to the arbitration potential being the first control potential;
      the second chip acts as a first slave, and is configured to communicate with the storage device in response to the arbitration potential being the second control potential;
   wherein the first chip and the second chip are configured to determine whether a preferential communication event occurs, and the first chip or the second chip in which the preferential communication event occurs is configured to enter an arbitration mode, so as to adjust the arbitration potential from a first arbitration potential to a second arbitration potential and to communicate with the storage device, and to adjust the arbitration potential from the second arbitration potential to the first arbitration potential in response to communication being completed.

2. The storage device sharing system according to claim 1, wherein the first chip has a first master-slave determination terminal for defining the first chip as the master, and the second chip has a second master-slave determination terminal for defining the second chip as the first slave, wherein, the first chip is configured to verify that the first chip is the master by determining a potential of the first master-slave determination terminal, and the second chip is configured to verify that the second chip is the first slave by determining a potential of the second master-slave determination terminal.

3. The storage device sharing system according to claim 1, wherein, in response to non-occurrence of the preferential communication event, the first chip and the second chip are configured to enter the toggle mode.

4. The storage device sharing system according to claim 1, wherein the step of entering the arbitration mode to adjust the arbitration potential from the first arbitration potential to the second arbitration potential, and communicating with the storage device further includes:

adjusting the arbitration potential to the second arbitration potential and waiting for a first predetermined time;
determining whether the arbitration potential is the first arbitration potential or the second arbitration potential;
in response to the arbitration potential being the second arbitration potential, communicating with the storage device.

5. The storage device sharing system according to claim 1, wherein, in response to the communication being completed, the step of adjusting the arbitration potential to the first arbitration potential further includes:

in response to the communication with the storage device being completed, waiting for a second predetermined time;
adjusting the arbitration potential to the first arbitration potential.

6. The storage device sharing system according to claim 1, wherein the first master-slave determination terminal is connected to a first voltage source through a first pull-up resistor, and the second master-slave determination terminal is connected to a ground terminal through a first pull-down resistor.

7. The storage device sharing system according to claim 1, wherein the first arbitration terminal and the second arbitration terminal are connected to a second voltage source through a second pull-up resistor, and the first arbitration potential and the second arbitration potential are opposite high and low potentials, respectively.

8. The storage device sharing system according to claim 1, wherein, in an initialization phase, the first chip and the second chip preferentially enter the toggle mode.

9. The storage device sharing system according to claim 1, further comprising a third chip connected to the storage device, wherein the third chip has a third master-slave determination terminal and a third arbitration terminal, the third arbitration terminal is connected to the first arbitration terminal and the second arbitration terminal and has the arbitration potential, and the third master-slave determination terminal is configured to define the third chip as a second slave.

10. The storage device sharing system according to claim 9, wherein the first chip, the second chip, and the third chip are configured to determine whether the preferential communication event occurs, and the first chip, the second chip or the third chip in which the preferential communication event occurs is configured to enter the arbitration mode, wherein the arbitration mode includes:

determining whether the arbitration potential is the first arbitration potential or the second arbitration potential;
in response to the arbitration potential being the first arbitration potential, adjusting the arbitration potential to the second arbitration potential, and initiating communication with the storage device;
in response to communication being completed, adjusting the arbitration potential to the first arbitration potential.

11. The storage device sharing system according to claim 9, wherein the third chip is further configured to enter the toggle mode, and in toggle mode, the first chip is further configured to:

use a voltage control circuit to control the first arbitration terminal, so as to periodically control the arbitration potential to the first control potential, the second control potential, and a third control potential;
determine whether the arbitration potential is the first control potential, the second control potential, or the third control potential; in response to determining that the arbitration potential is the first control potential, communicate with the storage device;

wherein the second chip is further configured to:
determine whether the arbitration potential is the first control potential, the second control potential, or the third control potential through a first signal converter;
in response to determining that the arbitration potential is the second control potential, communicate with the storage device;

wherein the third chip is further configured to:
verify that the third chip is the second slave by determining a potential of the third master-slave determination terminal;
determine whether the arbitration potential is the first control potential, the second control potential, or the third control potential through a second signal converter;
in response to determining that the arbitration potential is the third control potential, communicate with the storage device.

12. A storage device sharing method, adapted to a storage device sharing system that includes a storage device, a first chip and a second chip, and the storage device sharing method comprising:

connecting the first chip to the storage device, wherein the first chip has a first arbitration terminal;
connecting the second chip to the storage device, wherein the second chip has a second arbitration terminal, and the second arbitration terminal is connected to the first arbitration terminal and has an arbitration potential;
configuring the first chip and the second chip to enter a toggle mode, which includes:
configuring the first chip to act as a master, so as to control the arbitration potential to a first control potential and a second control potential through the first arbitration terminal, and to communicate with the storage device in response to the arbitration potential being the first control potential;
configuring the second chip to act as a first slave, so as to communicate with the storage device in response to the arbitration potential being the second control potential;
configuring the first chip and the second chip to determine whether a preferential communication event occurs, and configuring the first chip or the second chip in which the preferential communication event occurs to enter an arbitration mode, so as to adjust the arbitration potential from a first arbitration potential to a second arbitration potential and to communicate with the storage device, and to adjust the arbitration potential from the second arbitration potential to the first arbitration potential in response to communication being completed.

13. The storage device sharing method according to claim 12, wherein the first chip has a first master-slave determination terminal for defining the first chip as the master, and the second chip has a second master-slave determination terminal for defining the second chip as the first slave, and the storage device sharing method further comprises:
configuring the first chip to determine a potential of the first master-slave determination terminal, so as to verify that the first chip is the master, and configuring the second chip to determine a potential of the second master-slave determination terminal, so as to verify that the second chip is the first slave.

14. The storage device sharing method according to claim 12, further comprising:
configuring, in response to non-occurrence of the preferential communication event, the first chip and the second chip to enter the toggle mode.

15. The storage device sharing method according to claim 12, wherein the step of entering the arbitration mode to adjust the arbitration potential from the first arbitration potential to the second arbitration potential, and communicating with the storage device further includes:
adjusting the arbitration potential to the second arbitration potential and waiting for a first predetermined time;
determining whether the arbitration potential is the first arbitration potential or the second arbitration potential;
in response to the arbitration potential being the second arbitration potential, communicating with the storage device.

16. The storage device sharing method according to claim 12, wherein, in response to the communication being completed, the step of adjusting the arbitration potential to the first arbitration potential further includes:
in response to the communication with the storage device being completed, waiting for a second predetermined time;
adjusting the arbitration potential to the first arbitration potential.

17. The storage device sharing method according to claim 12, further comprising:
configuring, in an initialization phase, the first chip and the second chip to preferentially enter the toggle mode.

18. The storage device sharing method according to claim 12, wherein the storage device sharing system further includes a third chip, and the storage device sharing method further comprises:
connecting the third chip to the storage device, wherein the third chip has a third master-slave determination terminal and a third arbitration terminal, the third arbitration terminal is connected to the first arbitration terminal and the second arbitration terminal and has the arbitration potential, and the third master-slave determination terminal is configured to define the third chip as a second slave.

19. The storage device sharing method according to claim 18, further comprising: configuring the first chip, the second chip, and the third chip to determine whether the preferential communication event occurs; configuring the first chip, the second chip or the third chip in which the preferential communication event occurs to enter the arbitration mode, wherein the arbitration mode includes:
determining whether the arbitration potential is the first arbitration potential or the second arbitration potential;
in response to the arbitration potential being the first arbitration potential, adjusting the arbitration potential to the second arbitration potential, and initiating communication with the storage device;
in response to communication being completed, adjusting the arbitration potential to the first arbitration potential.

20. The storage device sharing method according to claim 18, further comprising: configuring the third chip to enter the toggle mode, wherein the toggle mode further includes configuring the first chip to:
use a voltage control circuit to control the first arbitration terminal, so as to periodically control the arbitration potential to be switched to the first control potential, the second control potential, and a third control potential;
determine whether the arbitration potential is the first control potential, the second control potential, or the third control potential;
in response to determining that the arbitration potential is the first control potential, communicate with the storage device;
configuring the second chip to:
determine whether the arbitration potential is the first control potential, the second control potential, or the third control potential through a first signal converter;
in response to determining that the arbitration potential is the second control potential, communicate with the storage device;
configuring the third chip to:
verify that the third chip is the second slave by determining a potential of the third master-slave determination terminal;
determine whether the arbitration potential is the first control potential, the second control potential, or the third control potential through a second signal converter;
in response to determining that the arbitration potential is the third control potential, communicate with the storage device.

\* \* \* \* \*